United States Patent [19]
Lou et al.

[11] Patent Number: 6,049,755
[45] Date of Patent: Apr. 11, 2000

[54] NAVIGATION SYSTEM VEHICLE LOCATION DISPLAY

[75] Inventors: Yongle Lou, Shelby Township; Jeffrey Alan Millington, Rochester Hills; Anthony Albert Slominski, Harrison Township, all of Mich.

[73] Assignee: Magellan DIS, Inc., Rochester Hills, Mich.

[21] Appl. No.: 09/114,670

[22] Filed: Jul. 13, 1998

Related U.S. Application Data

[60] Provisional application No. 60/084,292, May 5, 1998.

[51] Int. Cl.⁷ .......................... G01C 21/00; G01S 21/00; G06G 7/78
[52] U.S. Cl. .......................... 701/207; 701/208; 701/211; 701/212; 340/988; 340/990; 73/178 R
[58] Field of Search .................................... 701/200, 207, 701/208, 209, 211, 212, 214; 340/988, 990, 995; 73/178 R; 345/439, 472, 133, 145; 342/357.01, 357.08

[56] References Cited

U.S. PATENT DOCUMENTS

| | | |
|---|---|---|
| 5,583,494 | 12/1996 | Mizutani et al. . |
| 5,617,319 | 4/1997 | Arakawa et al. ..................... 364/449.1 |
| 5,890,088 | 3/1999 | Nimura et al. ........................... 701/208 |
| 5,908,464 | 6/1999 | Kishigami et al. ...................... 701/208 |
| 5,936,553 | 8/1999 | Kabel ....................................... 701/211 |
| 5,951,621 | 9/1999 | Palalau et al. .......................... 701/211 |
| 5,991,690 | 11/1999 | Murphy .................................. 701/211 |

FOREIGN PATENT DOCUMENTS

| | | |
|---|---|---|
| 0814871 | 6/1996 | European Pat. Off. . |
| 9292829 | 3/1997 | European Pat. Off. . |

*Primary Examiner*—William A. Cuchlinski, Jr.
*Assistant Examiner*—Gertrude Arthur
*Attorney, Agent, or Firm*—Howard & Howard

[57] ABSTRACT

The invention relates to a vehicle location display for a navigation system. The vehicle location display operates in either a graphical display mode or a textual display mode. In the graphical display mode the vehicle location display automatically scales the display to display the current location of the vehicle on the street currently being traveled, the previous cross street, the next cross street, and other vehicle information. When traveling on a freeway, the graphical display mode displays the current location of the vehicle on the freeway being traveled, the previous cross street and the next cross street. In the textual display mode the vehicle location display provides the current vehicle location by street or freeway name, city, county, state, latitude and longitude coordinates. In addition, the current compass heading, the previous cross street and the next cross street are provided. Icons displayed in the textual display mode enable a user to rapidly access emergency information and general information.

30 Claims, 3 Drawing Sheets

NAVIGATION SYSTEM VEHICLE LOCATION DISPLAY

This application claims the benefit of U.S. Provisional Application No. 60/084,292, filed May 5, 1998.

BACKGROUND OF THE INVENTION

This invention generally relates to navigation or route guidance systems and, more particularly, to a vehicle location display for a route guidance system.

Navigation systems generally provide a recommended route from a starting point to a desired destination. Generally, the starting point and desired destination are selected from a large database of roads stored in a mass media storage, such as a CD ROM or hard drive, which includes the roads in the area to be travelled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point, desired destination and highlighting the recommended route. Preferably, if the navigation system is installed in a vehicle, the navigation system displays the current location of the vehicle and provides turn-by-turn instructions to the driver, guiding the driver to the selected destination.

The typical navigation system provides the current vehicle location to the user by displaying either a textual guidance mode screen having a set of instructions and the current location or a guidance mode map showing the starting point, desired destination, current location and highlighting the recommended route. When a user has not determined a route, the typical navigation system displays a map of the current vehicle location and all of the surrounding streets.

One disadvantage of the typical guidance mode map showing the current location is its complexity. Because the guidance mode map contains so much information it can be difficult for a user to rapidly view the display to confirm the current location, major surrounding roads and the next maneuver instruction. Some guidance mode map displays permit the user to select a viewing scale to aid in reducing the complexity but, this requires further input from a user while the user is enroute.

Another disadvantage of current navigation system displays is that it can be time consuming, because of the number of required keystrokes, for a user to switch between the guidance mode map display and a display of stored textual information such as an address book, emergency information, or points of interest.

Thus, it is desirable to provide a vehicle location display that automatically reduces the complexity of a displayed map and shows the current vehicle location. It is furthermore desirable to provide a vehicle location display that permits a user to access stored textual information rapidly using a minimum number of keystrokes.

SUMMARY OF THE INVENTION

In general terms, this invention provides a vehicle location display for a navigation system. The vehicle location display displays a current vehicle location on a display device of a navigation system in either a graphical display mode or a textual display mode.

In the graphical display mode, when a vehicle is on a road the display device displays a map having a location street on which the vehicle is located and a current vehicle location cursor representing the current location of the vehicle on the location street. In addition, the display device displays a previous cross street and a next cross street. When the rank of the location street is greater than a threshold rank, then the displayed previous and next cross streets are selected based on their rank so that only previous and next cross streets having a rank greater than the threshold rank are displayed. In this situation, the display excludes from the display any cross streets having a rank that is equal to or less than the threshold rank. When the location street has a rank that is equal to or less than the threshold rank, then the next and previous cross streets displayed are selected without reference to their rank relative to the threshold rank and no previous or next cross streets are excluded from the display. When the vehicle is located on a freeway, the graphical display mode displays a location freeway and the current vehicle location cursor. In addition, the graphical display mode displays a previous cross street and a next cross street without respect to the rank of the previous or next cross street relative to the threshold rank.

In the textual display mode, the display device displays, textually, the information provided in the graphical display mode. In addition, the textual display mode permits a user rapid access to other stored textual information.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
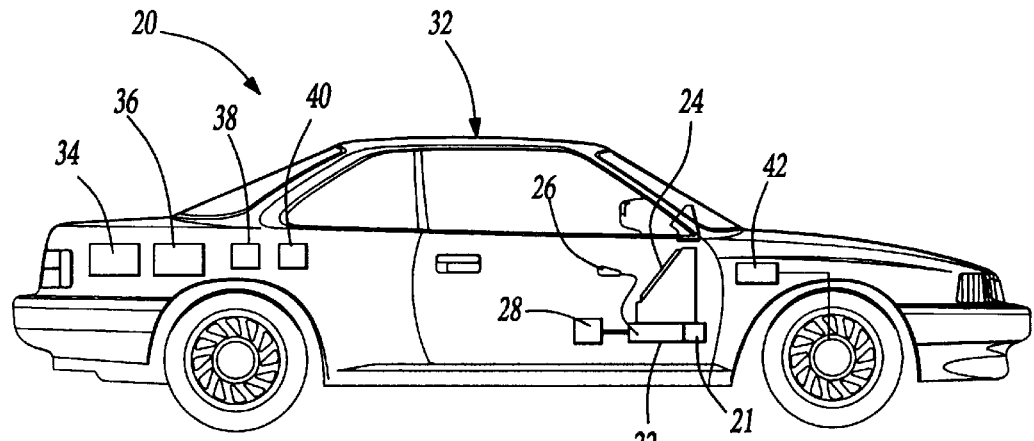
FIG. 1 is a schematic of a navigation system with the vehicle location display of the present invention installed in a vehicle.

The navigation system 20 of the present invention is shown schematically in FIG. 1. The navigation system 20 includes a CPU 22 (Central Processing Unit) having a route determination system 21 and connected to a display device 24, such as a high resolution LCD or flat panel display. The CPU 22 is also connected to an input device 26. The navigation system 20 further includes a database 28 connected to the CPU 22. The database 28 is a mass media storage device, such as a CD ROM or hard drive, which includes data of all the roads in the area to be travelled by the user. The navigation system 20 can display a map based on the data in the database 28. Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.).

Using algorithms well known in the art, route determination system 21 determines a route on said roads from a beginning point to a user selected destination point. Preferably, the beginning point is the current vehicle location as determined by the CPU 22 and one of the position determining devices discussed below. The determined route is based on the cost values. Preferably, the navigation system 20 displays the determined route on display device 24 and provides turn by turn instructions to the user.

Each road segment in the database 28 has a rank associated with it. The rank, for example, may be a number from zero to four, with four being the highest rank. The rank of a road segment is determined by a number of factors including: road geometry, such as the number of lanes; speed limit of the road segment; and type of road segment, such as freeway, primary street or subdivision street. Generally, the rank divides road segments from highest rank to lowest rank into a freeway, a primary street, a secondary street, and a subdivision street with a freeway being the highest rank. The rank of a given road segment can not be altered by a user.

The navigation system 20 can, but need not be installed in a vehicle 32. The navigation system can be used in conjunction with position determining devices, such as a GPS receiver 34, a gyroscope 36, a compass 38, an orthogonal multi-axis accelerometer 40 and a vehicle speed sensor 42, all connected to the CPU 22 (connections not shown for simplicity). Such position determining devices are well-known and are commercially available. Preferably, a combination of these position determining devices is utilized.

Figure 2:
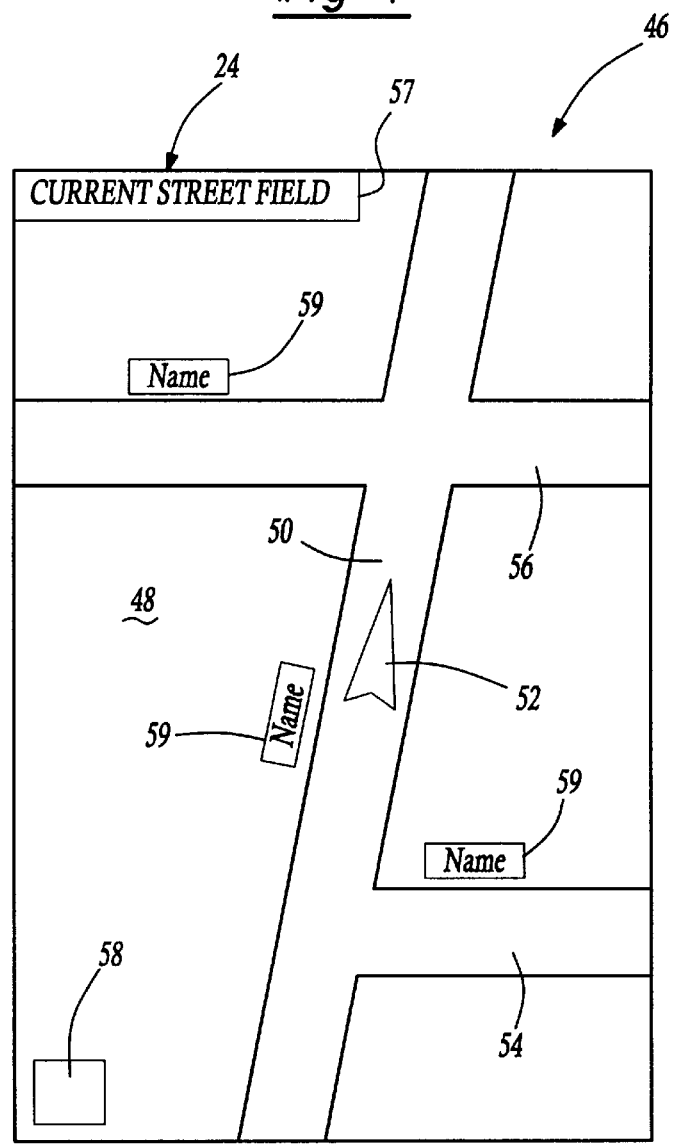
FIG. 2 is a screen display of an embodiment of the vehicle location display of the present invention illustrating a graphical display mode for a street location.

FIG. 2 is a screen display of an embodiment of a vehicle location display, shown generally at 46, of the present invention illustrating a graphical display mode of the vehicle location display 46 when the vehicle 32 is located on a street. The vehicle location display 46 operates independently from the route determination system 21 and it can be accessed and displayed on display device 24 even when a user has not determined a route with the route determination system 21. In the graphical display mode, the display device 24 displays a map 48 having a current location street 50 on which the vehicle 32 is located. The current location street 50 is obtained from the database 28 in conjunction with one of the position determining devices noted above. The display device 24 also displays on the map 48 a vehicle cursor 52 that represents the current location of the vehicle 32 on the location street 50 relative to database 28. A previous cross street 54 and a next cross street 56, selected based on the database 28 and the current vehicle location, are also displayed on the map 48. As used in this specification and the accompanying claims, a cross street is defined as a street that is connected to the location street 50 in any fashion or that crosses over or under the location street 50. In FIG. 2, both the previous cross street 54 and the next cross street 56 are connected to the location street 50. A current heading field 58 displays the current compass heading of the vehicle 32. Adjacent each of the streets 50, 54, and 56 is a street name field 59 that displays the name of the associated street 50, 54 or 56. A current street field 57 displays the name of location street 50.

The previous cross street 54 and the next cross street 56 displayed are selected based on the rank of the location street 50 and a threshold rank. When the location street 50 has a rank that is greater than the threshold rank, then only a next cross street 56 and a previous cross street 54 having a rank that is greater than the threshold rank are shown. In this situation, the navigation system 20 excludes from display device 24 any cross streets that are located between the next cross street 56 and previous cross street 54 and that have a rank equal to or less than the threshold rank. Thus, the complexity of the map 48 on display device 24 is reduced by filtering out of the display cross streets having a rank equal to or lower than the threshold rank and that are located between the next cross street 56 and the previous cross street 54.

When the location street 50 has a rank that is equal to or lower than the threshold rank, then a next cross street 56 and a previous cross street 54 are selected without regard to their rank relative to the threshold rank. Thus, the map 48 shows the immediate next and immediate previous cross streets. Preferably, the threshold rank is chosen to be the lowest rank in database 28. As will be understood by one of ordinary skill in the art, the threshold rank need not be set to the lowest rank in database 28. In addition, as noted above, next cross street 56 and previous cross street 54 need not be connected to location street 50, they could cross over or under location street 50.

The scale of the map 48 on the display device 24 is automatically adjusted by the CPU 22 to provide a display that shows the vehicle cursor 52 and only a portion of the current location street 50, previous cross street 54 and next cross street.

Figure 3:
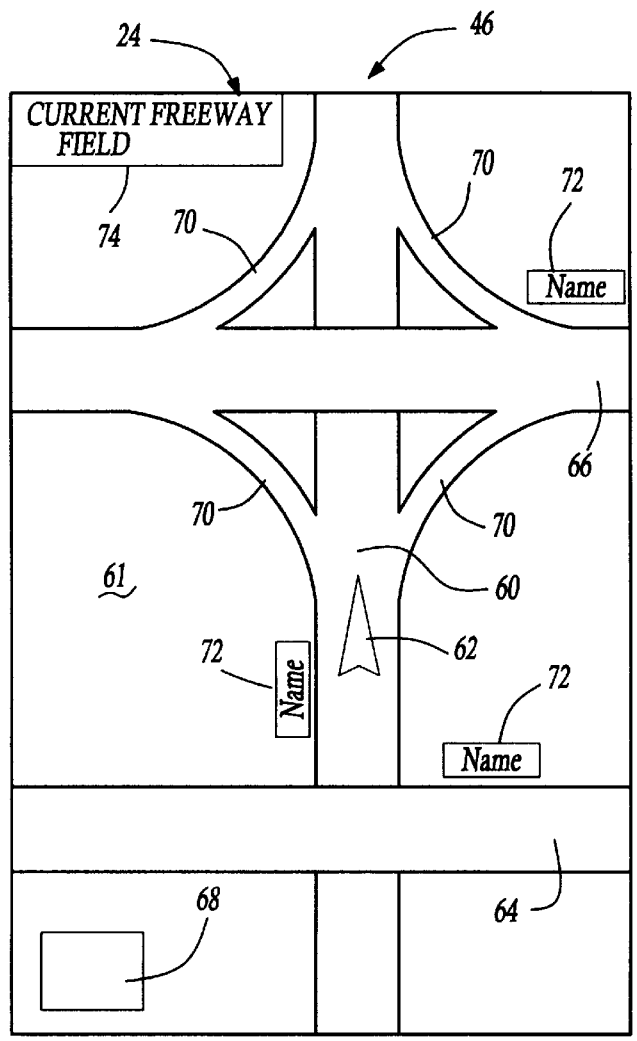
FIG. 3 is a screen display of an embodiment of the vehicle location display of the present invention illustrating a graphical display mode for a freeway location.

FIG. 3 is a screen display of an embodiment of the vehicle location display 46 of the present invention illustrating the graphical display mode of the vehicle location display when the vehicle 32 is on a freeway. In this mode, the display device 24 displays a map 61 having a current location freeway 60 on which the vehicle 32 is located. The current location freeway 60 is obtained from the database 28 in conjunction with one of the position determining devices noted above. The display device 24 also displays on the map 61 a vehicle cursor 62 that represents the current location of the vehicle 32 on the location freeway 60 relative to the database 28. A previous cross street 64 and a next cross street 66, selected based on the database 28 and the current vehicle location, are also displayed on map 61. In FIG. 3, the previous cross street 64 shown is a cross street that crosses over location freeway 60, but cross street 64 is not connected to location freeway 60. The next cross street 66 is connected to the location freeway 60.

Because a freeway has the highest rank in the database 28, when the vehicle 32 is on a freeway the rank of the previous cross street 64 and next cross street 66 relative to the threshold rank does not determine which cross streets are displayed. Instead, the immediate past and immediate next cross streets are displayed as the previous cross street 64 and next cross street 66. As will be understood by one of ordinary skill in the art, next cross street 66 and previous cross street 64 may either be streets or other freeways. A current heading field 68 displays the current compass heading of the vehicle 32. Preferably, the display device 24 also displays on map 61 freeway ramps 70 associated with either the previous cross street 64 or the next cross street 66. In FIG. 3, freeway ramps 70 are shown associated with the next cross street 66. As would be understood by one of ordinary skill in the art, previous cross street 64 could also be shown with freeway ramps 70 as appropriate. In a most preferred embodiment, the navigation system 20 displays an off ramp of a next cross street 66 and an on ramp of a previous cross street 64. Adjacent the freeway 60 and cross streets 64 and 66 is a name field 72 that displays the name of the associated freeway 60 and cross street 64 or 66. A current freeway field 74 displays the name of location freeway 60.

The scale of the map 61 on display device 24 is automatically adjusted by the CPU 22 to provide a display that shows the vehicle cursor 62 and only a portion of the current location freeway 60, previous cross street 64 and next cross street 66. As noted above, the vehicle location display 46 operates independently from the route determination system 21 and it can be accessed and displayed on display device 24 even when a user has not determined a route with the route determination system 21.

Figure 4:
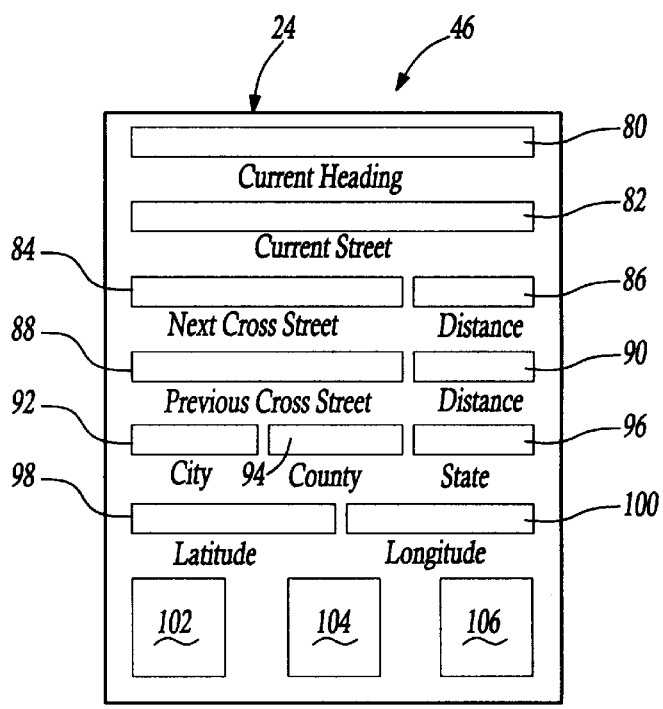
FIG. 4 is a screen display of an embodiment of the vehicle location display of the present invention illustrating a textual display mode.

FIG. 4 is a screen display of an embodiment of the vehicle location display 46 of the present invention illustrating a textual display mode of the vehicle location display 46. In this mode, the display device 24 displays a current heading field 80 that has the current compass heading of the vehicle 32. A current location field 82 includes the name of the current location street 50 or location freeway 60, which the vehicle 32 is located on. A next cross street field 84 displays the name of the next cross street 56 or 66 selected in the manner described above for the graphical display mode. A distance field 86 displays the distance between the current location of the vehicle 32 and the next cross street 56 or 66 displayed in field 84. A previous cross street field 88 displays the name of the previous cross street 54 or 64 selected in the manner described above for the graphical display mode. A distance field 90 displays the distance between the current location of the vehicle 32 and the previous cross street 54 or 64 displayed in field 88.

In the textual display mode, the display device 24 also displays a current city field 92, a current county field 94 and a current state field 96, which include the appropriate data based on the current location of the vehicle 32. In addition, the display device 24 displays a current latitude field 98 and a current longitude field 100, which show the latitude and longitude coordinates, respectively, of the current location of the vehicle 32.

An address book icon 102, points of interest icon 104 and third party data icon 106 are also displayed in the textual display mode on the display device 24. Activation of the address book icon 102, through the input device 26 by the user, activates an address book feature (not shown) as is known in the art. The first entries shown when the address book icon 102 is initially activated are user defined priority entries. Activation of the points of interest icon 104, through the input device 26 by the user, activates a points of interest feature (not shown) as is known in the art and the initially selected points of interest displayed are emergency services. Activation of the third party data icon 106, through the input device 26 by the user, activates a variety of third party data (not shown) as is known in the art. Thus, in the textual display mode the vehicle location display 46 provides access to a variety of emergency and general information in addition to the current vehicle location.

Figure 5:
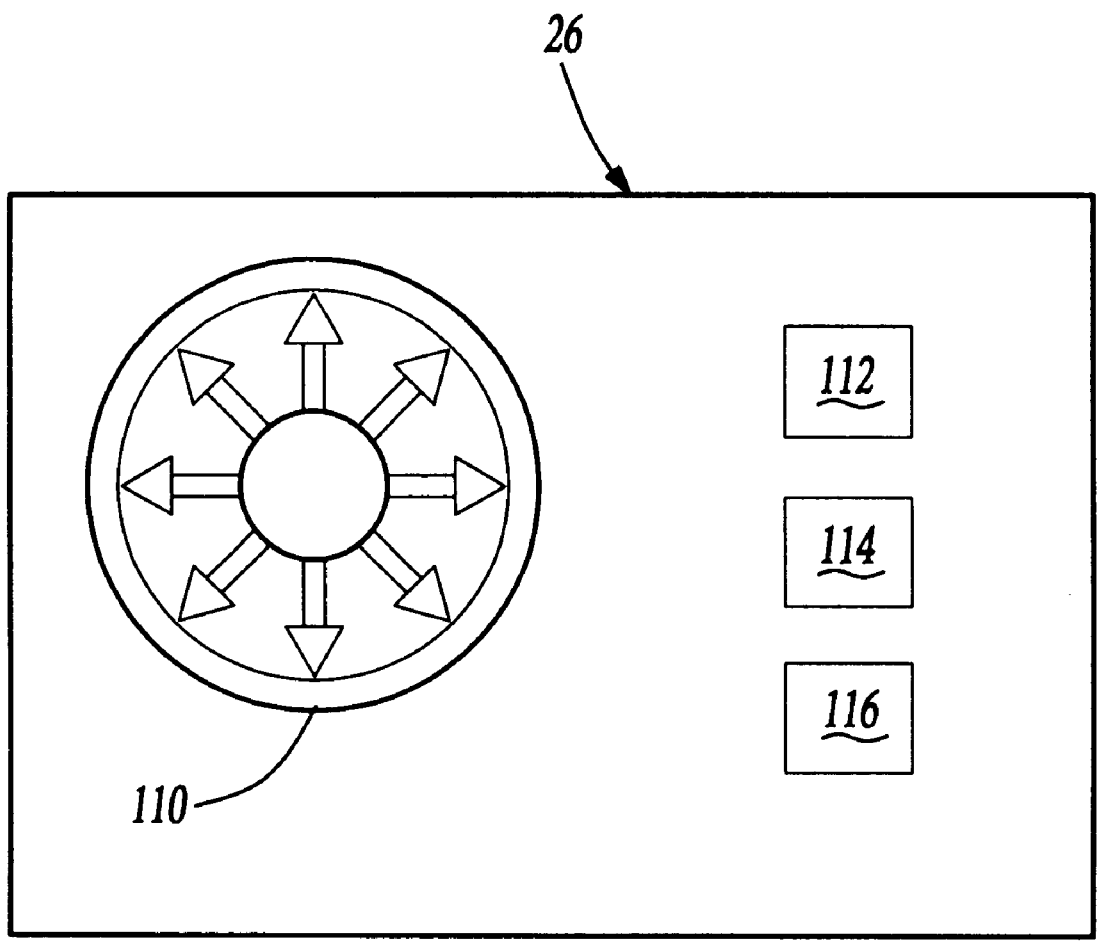
FIG. 5 is a schematic view of a user input device.

FIG. 5 is a schematic view of one embodiment of a user input device 26. The user input device 26 includes a directional input button 110 for permitting user input. A location button 112, view button 114 and a cancel button 116 are also connected to the user input device 26. Pressing the location button 112 activates the vehicle location display 46 in either the graphical display mode or the textual display mode depending on the vehicle speed. The vehicle speed at the time the location button 112 is pressed can be provided by the vehicle speed sensor 42, accelerometer 40, GPS receiver 34 or other methods as are known in the art.

When the vehicle 32 is moving on a street the vehicle location display 46 initially displays the vehicle location in the graphical display mode as shown in FIG. 2. When the vehicle 32 is moving on a freeway the vehicle location display 46 initially displays the vehicle location in the graphical display mode as shown in FIG. 3.

When the vehicle is not moving the vehicle location display 46 initially displays the vehicle location in the textual display mode as shown in FIG. 4. Pressing the view button 114 toggles between the graphical display mode and the textual display mode. Pressing the cancel button 116 displays the screen previously displayed before the location button 112 was pressed. If there is no input activity for a period of time, preferably 30 seconds, after the navigation system 20 has been powered up the navigation system 20 automatically activates the vehicle location display 46 in either the graphical display mode or the textual display mode depending on the speed of the vehicle 32.

There are several special cases wherein the vehicle location display 46 varies slightly from that described above. When the vehicle 32 is on a ferry, the location of the departure dock will be shown as the previous cross street 54 and the location of the destination dock will be displayed as the next cross street 56. When vehicle 32 is located on a location street 50 that comprises a rotary or circular road segment, as is commonly found in Boston, U.S.A., then map 48 will be scaled to display all cross streets that cross location street 50, which is the rotary road segment. In the textual display mode in this situation, only the current street field 82 will display the name of location street 50 fields 84 and 88 will be blank. A third special case is when vehicle 32 is exiting a freeway and is located on the freeway ramp 70. In this situation, the next street 66 is the street that the ramp connects with, the location freeway 60 is the current ramp, and the previous cross street 64 is the freeway. The same sort of information is displayed when vehicle 32 is entering a freeway via an on ramp.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for displaying a current vehicle location using a navigation system comprising the steps of:
   a.) providing a database of road segments, each of said road segments having a rank;
   b.) determining a current vehicle location relative to said database of roads and displaying said location on a display;
   c.) displaying a location street, said location street based on said current vehicle location;
   d.) displaying a previous cross street and a next cross street of said location street, wherein said previous cross street and said next cross street have a rank that is greater than a threshold rank when the rank of said location street is greater than said threshold rank and excluding from said display cross streets between said next cross street and said previous cross street that have a rank that is equal to or less than said threshold rank; and e.) displaying a previous cross street and a next cross street wherein said previous cross street and next cross street have any rank when the rank of said location street is equal to or less than said threshold rank.

2. A method as recited in claim 1 further comprising the step of displaying a current heading of a vehicle.

3. A method as recited in claim 1 comprising the further steps of:

displaying a map having said location street, said previous cross street and said next cross street; and said method including the step of automatically scaling said map to show only a portion of said location street, said previous cross street and said next cross street.

4. A method as recited in claim 3 wherein step b.) further comprises displaying a vehicle cursor on said location street at said current vehicle location.

5. A method as recited in claim 1 wherein step b.) comprises the further step of determining a latitude coordinate and a longitude coordinate of a vehicle relative to said database; and displaying said latitude coordinate and said longitude coordinate.

6. A method as recited in claim 1 comprising the further step of displaying a plurality of user selectable icons each associated with a plurality of locations relative to said database.

7. A method as recited in claim 1 comprising the further steps of:

displaying a distance between said current vehicle location and said previous cross street; and displaying a distance between said current vehicle location and said next cross street.

8. A method as recited in claim 1 wherein said location street comprises a location freeway and step c.) comprises the step of displaying said location freeway, said location freeway based on said current vehicle location; and step d.) comprises displaying a previous cross street and a next cross street of said location freeway, said previous cross street and said next cross street not based on the rank of said location freeway relative to said threshold rank.

9. A method as recited in claim 8 comprising the further steps of:

displaying a distance between said current vehicle location and said previous cross street; and displaying a distance between said current vehicle location and said next cross street.

10. A method as recited in claim 8 comprising the further steps of:

displaying a map having said location freeway, said previous cross street and said next cross street; and said method including the step of automatically scaling said map to show only said location freeway, said previous cross street and said next cross street.

11. A method as recited in claim 10 wherein step b.) further comprises displaying a vehicle cursor on said location freeway at said current vehicle location.

12. A method for displaying a current vehicle location using a navigation system comprising the steps of:

a.) providing a database of road segments;

b.) determining a current vehicle location relative to said database of roads;

c.) displaying on a display a map having a location street and a vehicle cursor on said location street, said location street and said vehicle cursor based on said current vehicle location;

d.) displaying on said map a previous cross street and a next cross street of said location street; and e.) automatically scaling said map to show said vehicle cursor and only a portion of said location street, said previous cross street and said next cross street.

13. A method as recited in claim 12 further comprising the step of displaying a current heading of a vehicle.

14. A method as recited in claim 12 wherein:

step c.) comprises the step of displaying on said map a location freeway and a vehicle cursor on said location freeway, said location freeway and said vehicle cursor based on said current vehicle location; and step d.) comprises the step of displaying on said map a previous cross street and a next cross street of said location freeway; and step e.) comprises the step of automatically scaling said map to show said vehicle cursor and only said location freeway, said previous cross street and said next cross street.

15. A method as recited in claim 14 further comprising the step of displaying a current heading of a vehicle.

16. A vehicle location display of a navigation system comprising:

a database of road segments, each of said road segments having a rank;

a position determining device, said position determining device determining a current vehicle location relative to said database;

a display displaying said current vehicle location;

said display displaying a current location street of said current vehicle location, a next cross street and a previous cross street of said location street, said next cross street and said previous cross street having a rank that is greater than a threshold rank when the rank of said location street is greater than said threshold rank and said display excluding cross streets between said next and previous cross streets that have a rank that is less than or equal to said threshold rank; and said display displaying a current location street of said current vehicle location, a next cross street and a previous cross street, said next cross street and said previous cross street having any rank when the rank of said location street is equal to or less than said threshold rank.

17. A vehicle location display of a navigation system as recited in claim 16 wherein said display displays a current heading of a vehicle.

18. A vehicle location display of a navigation system as recited in claim 16 wherein said display displays a map having said location street, said previous cross street and said next cross street; and said map being automatically scaled to show only a portion of said location street, said previous cross street and said next cross street.

19. A vehicle location display of a navigation system as recited in claim 18 wherein said display displays a vehicle cursor on said location street at said current vehicle location.

20. A vehicle location display of a navigation system as recited in claim 16 wherein said position determining device determines a latitude coordinate and a longitude coordinate of a vehicle relative to said database; and said display displays said latitude coordinate and said longitude coordinate.

21. A vehicle location display of a navigation system as recited in claim 16 wherein said display displays a plurality of user selectable icons each associated with a plurality of locations relative to said database.

22. A vehicle location display of a navigation system as recited in claim 16 wherein said display displays a distance between said current vehicle location and said previous cross street and a distance between said current vehicle location and said next cross street.

23. A vehicle location display of a navigation system as recited in claim 16 wherein said display displays a location freeway, said location freeway based on said current vehicle location; and said display displays a previous cross street and a next cross street of said location freeway, said previous cross street and said cross street not based on the rank of said location freeway relative to said threshold rank.

24. A vehicle location display of a navigation system as recited in claim 23 wherein said display displays a distance between said current vehicle location and said previous cross street and a distance between said current vehicle location and said next cross street.

25. A vehicle location display of a navigation system as recited in claim 23 wherein said display displays a map having said location freeway, said previous cross street and said next cross street; and said map being automatically scaled to show only said location freeway, said previous cross street and said next cross street.

26. A vehicle location display of a navigation system as recited in claim 25 wherein said display displays a vehicle cursor on said location freeway at said current vehicle location.

27. A vehicle location display of a navigation system comprising:

a database of road segments;

a position determining device, said position determining device determining a position of a vehicle relative to said database of road segments;

a display displaying a map having a location street and a vehicle cursor on said location street, said location street and said vehicle cursor based on said current vehicle location;

said display displaying on said map a previous cross street and a next cross street of said location street; and said map being automatically scaled to display said vehicle cursor and only a portion of said location street, said previous cross street and said next cross street.

28. A vehicle location display of a navigation system as recited in claim 27 wherein said display displays a current heading of a vehicle.

29. A vehicle location display of a navigation system as recited in claim 27 wherein:

said display displays a map having a location freeway and a vehicle cursor on said location freeway, said location freeway and said vehicle cursor based on said current vehicle location;

said display displaying on said map a previous cross street and a next cross street of said location freeway; and said map being automatically scaled to show said vehicle cursor and only said location freeway, said previous cross street and said next cross street.

30. A vehicle location display of a navigation system as recited in claim 29 wherein said display displays a current heading of a vehicle.

* * * * *

UNITED STATES PATENT AND TRADEMARK OFFICE
CERTIFICATE OF CORRECTION

PATENT NO.    : 6,049,755
DATED         : April 11, 2000
INVENTOR(S)   : Lou et al.

Page 1 of 1

It is certified that error appears in the above-identified patent and that said Letters Patent is hereby corrected as shown below:

<u>Column 9,</u>
Line 20, claim 23 should be amended as follows:
"said cross street" should read -- said next cross street --.

Signed and Sealed this

Eleventh Day of June, 2002

Attest:

Attesting Officer

JAMES E. ROGAN
Director of the United States Patent and Trademark Office